(12) United States Patent
Jia

(10) Patent No.: US 10,359,548 B2
(45) Date of Patent: Jul. 23, 2019

(54) COLOR FILTER SUBSTRATE AND METHOD FOR MANUFACTURING THE SAME

(71) Applicant: WUHAN CHINA STAR OPTOELECTRONICS TECHNOLOGY CO., LTD., Wuhan, Hubei (CN)

(72) Inventor: Yingbin Jia, Hubei (CN)

(73) Assignee: WUHAN CHINA STAR OPTOELECTRONICS TECHNOLOG CO., LTD, Wuhan, Hubei (CN)

( * ) Notice: Subject to any disclaimer, the term of this patent is extended or adjusted under 35 U.S.C. 154(b) by 0 days.

(21) Appl. No.: 15/224,565

(22) Filed: Jul. 31, 2016

(65) Prior Publication Data

US 2017/0242167 A1    Aug. 24, 2017

(30) Foreign Application Priority Data

Feb. 18, 2016  (CN) .......................... 2016 1 0090383

(51) Int. Cl.
*G02B 5/20* (2006.01)
*G02B 1/14* (2015.01)
(Continued)

(52) U.S. Cl.
CPC .............. *G02B 5/201* (2013.01); *G02B 1/14* (2015.01); *G02F 1/133512* (2013.01); *G02F 1/133516* (2013.01); *G02F 1/134363* (2013.01)

(58) Field of Classification Search
CPC ......... G02F 1/133514; G02F 1/133512; G02F 1/136209; G02F 2001/136222; G02B 5/20
See application file for complete search history.

(56) References Cited

U.S. PATENT DOCUMENTS 7,547,494 B2   6/2009  Zhan
7,656,466 B2   2/2010  Do et al.
(Continued)

FOREIGN PATENT DOCUMENTS

CN    101013174 A    8/2007
CN    101713883 A    5/2010
(Continued)

*Primary Examiner* — William R Alexander
*Assistant Examiner* — Balram T Parbadia
(74) *Attorney, Agent, or Firm* — Soroker Agmon Nordman

(57) ABSTRACT

A color filter substrate has a transparent base; a first transparent electrode layer; a black matrix having a plurality of black sections spaced from each other on the first transparent electrode layer; a second transparent electrode layer, and a color resistor layer, in sequence. A method for manufacturing the color filter substrate has steps of: forming a first transparent electrode layer on a transparent base; forming a black matrix having a plurality of black sections spaced from each other on the first transparent electrode layer; forming a second transparent electrode layer on the black sections and the first transparent electrode layer; and forming a color resistor layer on the second transparent electrode layer. The interference of the internal electric field is shielded by disposing the black sections between the first transparent electrode layer and the second transparent electrode layer.

14 Claims, 2 Drawing Sheets

(51) Int. Cl.
*G02F 1/1335* (2006.01)
*G02F 1/1343* (2006.01)

(56) References Cited

U.S. PATENT DOCUMENTS

| | | |
|---|---|---|
| 8,310,609 B2 | 11/2012 | Yoshida et al. |
| 2002/0130991 A1* | 9/2002 | Kamijo ............. G02F 1/133514 349/106 |
| 2004/0001170 A1* | 1/2004 | Chang ............... G02F 1/136227 349/106 |
| 2004/0109101 A1* | 6/2004 | Kim ................. G02F 1/136209 349/44 |
| 2005/0052594 A1* | 3/2005 | Lee .................. G02F 1/133382 349/110 |
| 2005/0122450 A1* | 6/2005 | Kang ................ G02F 1/133514 349/114 |
| 2008/0002110 A1* | 1/2008 | Choi ................ G02F 1/133514 349/106 |
| 2010/0066954 A1* | 3/2010 | Wang ................ G02F 1/133514 349/106 |
| 2010/0136868 A1* | 6/2010 | Chien ................. G06F 3/0412 445/24 |
| 2010/0141876 A1* | 6/2010 | Seo .................. G02F 1/133514 349/106 |
| 2013/0044384 A1* | 2/2013 | Kim ........................ B05D 5/06 359/885 |
| 2013/0182205 A1* | 7/2013 | Hibayashi .............. G02B 5/201 349/106 |
| 2015/0338638 A1* | 11/2015 | Xu ................... G02F 1/133512 359/228 |
| 2016/0033836 A1* | 2/2016 | Chen ........................ G02F 1/15 359/275 |

FOREIGN PATENT DOCUMENTS

| | | |
|---|---|---|
| CN | 102866530 A | 1/2013 |
| JP | H11185673 A | 7/1999 |
| KR | 20080033729 A | 4/2008 |

* cited by examiner

COLOR FILTER SUBSTRATE AND METHOD FOR MANUFACTURING THE SAME

CROSS REFERENCE TO RELATED APPLICATIONS

This application claims the priority of China Patent Application serial No. 201610090383.5, filed on Feb. 18, 2016, the disclosure of which is incorporated herein by reference.

FIELD OF THE INVENTION

The present invention relates to a color filter substrate and a manufacturing method thereof, and more particularly to a color filter substrate applied to IPS (in-plane-switching) display technology and a method for manufacturing the color filter substrate.

BACKGROUND OF THE INVENTION

Currently, in a variety of display technologies, liquid crystal display has been widely accepted as a mature technology. Liquid crystal displays (LCD) use the electro-optic effect of the liquid crystal, and the intensity of the light transmitted through the color resistance from a backlight module is adjusted by controlling the transmittance and reflectance of the liquid crystal molecules through a circuit to achieve different gray levels and different color displays.

Generally, a liquid crystal display panel includes an array substrate, a color filter substrate, and a liquid crystal layer disposed between the array substrate and the color filter substrate. The color filter substrate generally has a RGB color resistor layer and a black matrix. The black matrix is used for spacing different color resistor layers, improving the color contrast, and reducing light leakage. However, the current materials used for forming the black matrix are mainly carbon-based materials having conductivity that is easily induced by the IPS electric field to generate an internal electric field caused by the charge movement of the carbon-based materials, so that the orientation behavior of liquid crystal molecules is influenced.

Moreover, the higher carbon content of the material makes the material have a higher optical density (OD), which is advantageous to the black matrix but disadvantageous to the resistance, so that the carbon content of the material is limited and the improvement of the OD value is also limited. Although the material of the black matrix with high carbon number can reach the required OD criteria by a thinner thickness, the defects such as green mura and light leakage easily occur in the manufactured panel due to the lower resistance.

Currently, the abovementioned defects are usually improved by modifying the material features of the black matrix. However, the material improvement is generally time consuming and difficult to make a breakthrough, so that the progress is limited. In addition, it is rare to improve the abovementioned defects by modifying the structural design.

It is therefore necessary to provide a color filter substrate and a manufacturing method thereof to modify the structure of the color filter substrate to solve the problems existing in the conventional technology as described above.

SUMMARY OF THE INVENTION

A primary object of the present invention is to provide a color filter substrate and a method for manufacturing the same, thereby shielding a black matrix by using two layers of transparent conductive layers, so that the materials of the black matrix is not limited and the problems of green mura and light leakage can be improved. The interference caused by the electric field coupling (an electrostatic field or an alternating electric field) can be effectively eliminated or suppressed, so that liquid crystal molecules are not influenced by the materials of the black matrix to change the orientation behavior, and thus the display quality can be improved.

A secondary object of the present invention is to provide a method for manufacturing a color filter substrate. A sandwiched black matrix produced by using the coating technology can improve the panel quality, increase the yield, and facilitate mass production, and thus it is very advantageous to the production cost.

To achieve the above objects, the present invention provides a color filter substrate, comprising in sequence: a transparent base; a first transparent electrode layer formed on the transparent base; a black matrix comprising a plurality of black sections spaced from each other on the first transparent electrode layer; a second transparent electrode layer formed on the black sections and the first transparent electrode layer; and a color resistor layer formed on the second transparent electrode layer; wherein the black sections are disposed between the first transparent electrode layer and the second transparent electrode layer.

In one embodiment of the present invention, the color filter substrate further comprises a protective plane formed on the color resistor layer.

In one embodiment of the present invention, the color filter substrate further comprises a plurality of space units spaced from each other on the protective plane and aligned to a portion of the black sections.

In one embodiment of the present invention, a portion of the second transparent electrode layer is aligned to the black sections and directly contacts with the protective plane.

In one embodiment of the present invention, the color resistor layer comprises a plurality of color resistor units and each of the color resistor units is disposed between two of the black sections adjacent to each other.

In one embodiment of the present invention, a portion of the first transparent electrode layer is aligned to the color resistor units and is disposed between the second transparent electrode layer and the transparent base.

In one embodiment of the present invention, a portion of the second transparent electrode layer is disposed between the first transparent electrode layer and the color resistor layer.

In one embodiment of the present invention, the portion of the second transparent electrode layer directly contacts with the first transparent electrode layer.

In one embodiment of the present invention, the first transparent electrode layer and the second transparent electrode layer commonly define a sealed space for containing at least one of the black sections.

To achieve the above objects, another embodiment of the present invention further provides a method for manufacturing a color filter substrate, comprising steps of: providing a transparent base; forming a first transparent electrode layer on the transparent base; forming a black matrix having a plurality of black sections spaced from each other on the first transparent electrode layer; forming a second transparent electrode layer on the black sections and the first transparent electrode layer; and forming a color resistor layer on the second transparent electrode layer; wherein the black sections are disposed between the first transparent electrode layer and the second transparent electrode layer.

In one embodiment of the present invention, after forming the color resistor layer, the method further comprises a step of forming a protective plane on the color resistor layer.

In one embodiment of the present invention, the method further comprises a step of forming a plurality of space units aligned to a portion of the black sections on the protective plane.

In one embodiment of the present invention, a portion of the second transparent electrode layer is aligned to the black sections and directly contacts with the protective plane.

In one embodiment of the present invention, the color resistor layer comprises a plurality of color resistor units and each of the color resistor units is disposed between two of the black sections adjacent to each other.

In one embodiment of the present invention, a portion of the first transparent electrode layer is aligned to the color resistor units and is disposed between the second transparent electrode layer and the transparent base.

In one embodiment of the present invention, a portion of the second transparent electrode layer is disposed between the first transparent electrode layer and the color resistor layer.

In one embodiment of the present invention, the portion of the second transparent electrode layer directly contacts with the first transparent electrode layer.

In one embodiment of the present invention, the first transparent electrode layer and the second transparent electrode layer commonly define a sealed space for containing at least one of the black sections.

The abovementioned features adopted by the present invention to achieve the above and other objects can be best understood by referring to the following detailed description of the preferred embodiments and the accompanying drawings.

DETAILED DESCRIPTION OF THE PREFERRED EMBODIMENTS

The detailed description of the following embodiments is used for exemplifying the specific embodiments of the present invention by referring to the accompany drawings. Furthermore, directional terms described by the present invention, such as upper, lower, front, back, left, right, inner, outer, side, etc., are only directions by referring to the accompanying drawings, and thus the directional terms are used to describe and understand the present invention, but the present invention is not limited thereto.

Figure 1:
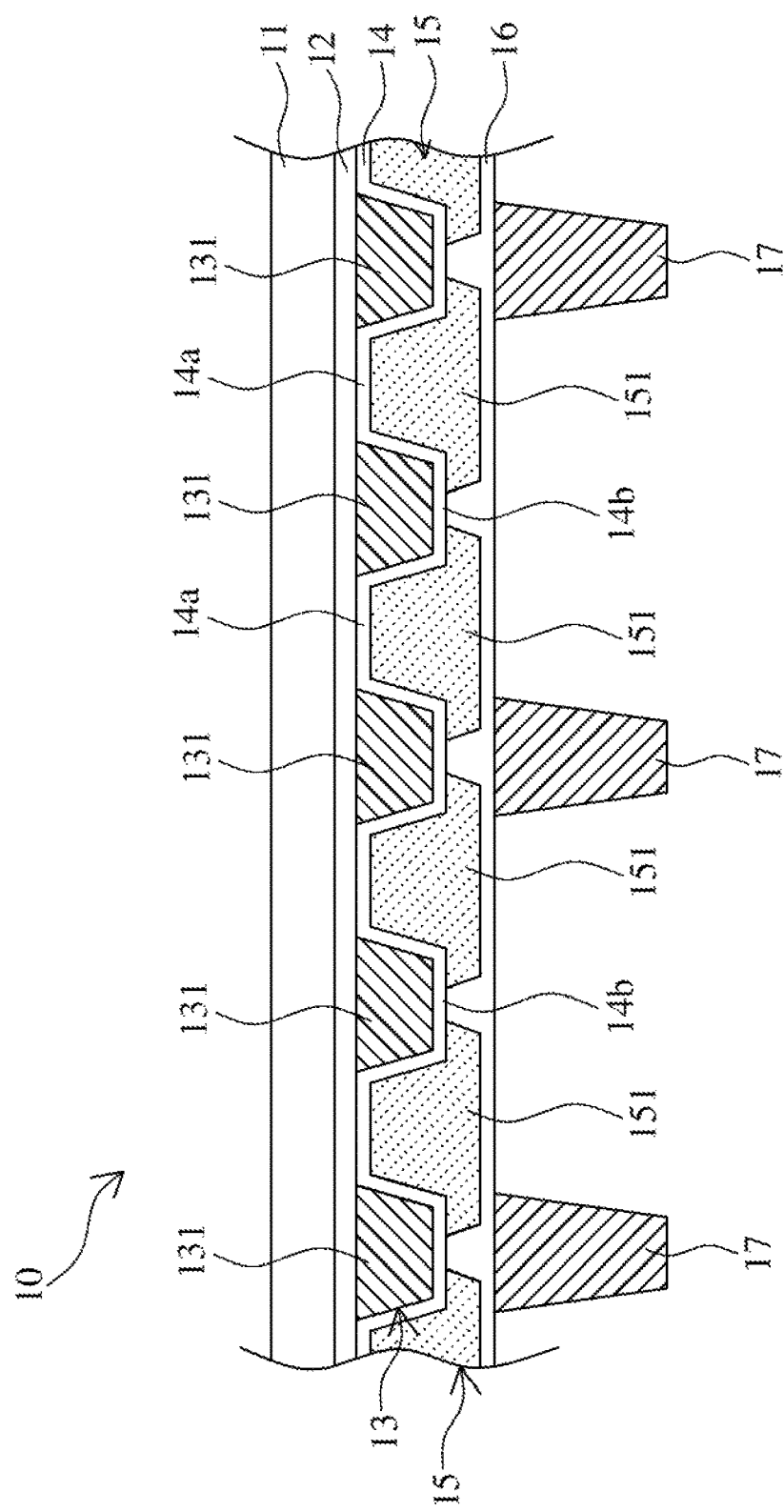
FIG. 1 is a cross-sectional view of a color filter substrate according to one embodiment of the present invention.

Referring to FIG. 1, which shows a cross-sectional view of a color filter substrate 10 according to one embodiment of the present invention. The color filter substrate 10 of the present invention can be applied to the IPS display technology for reducing the interference to a black matrix from an electrostatic field or an alternating electric field caused by the IPS electric field. The color filter substrate 10 mainly comprises a transparent base 11; a first transparent electrode layer 12; a black matrix 13; a second transparent electrode layer 14; and a color resistor layer 15. The first transparent electrode layer 12 is formed on the transparent base 11. The black matrix 13 comprises a plurality of black sections 131 spaced from each other and arranged on the first transparent electrode layer 12. The second transparent electrode layer 14 is formed on the black sections 131 and the first transparent electrode layer 12. The color resistor layer 15 is formed on the second transparent electrode layer 14 and comprises a plurality of color resistor units 151. Each of the color resistor units 151 is disposed between two of the black sections 131 adjacent to each other. Preferably, the black sections 131 are disposed between the first transparent electrode layer 12 and the second transparent electrode layer 14.

Next, referring to FIG. 1, a portion of the first transparent electrode layer 12 is aligned to the color resistor units 151 and disposed between the second transparent electrode layer 14 and the transparent base 11. A portion 14a of the second transparent electrode layer 14 is disposed between the first transparent electrode layer 12 and the color resistor layer 15. The portion 14a of the second transparent electrode layer 14 directly contacts with the first transparent electrode layer 12. The first transparent electrode layer 12 and the second transparent electrode layer 14 commonly define a sealed space for containing at least one of the black sections 131.

Subsequently referring to FIG. 1, the color filter substrate 12 according to one embodiment of the present invention can further comprise a protective plane 16 formed on the color resistor layer 15, and filling the intervals between the color resistor units 151 to form a flat surface. Preferably, a portion 14b of the second transparent electrode layer 14 is aligned to the black sections 131 and directly contacts with the protective plane 16. In addition, the color filter substrate 10 can further comprise a plurality of space units 17 spaced from each other on the protective plane 16 and aligned to a portion of the black sections 131.

Figure 2:
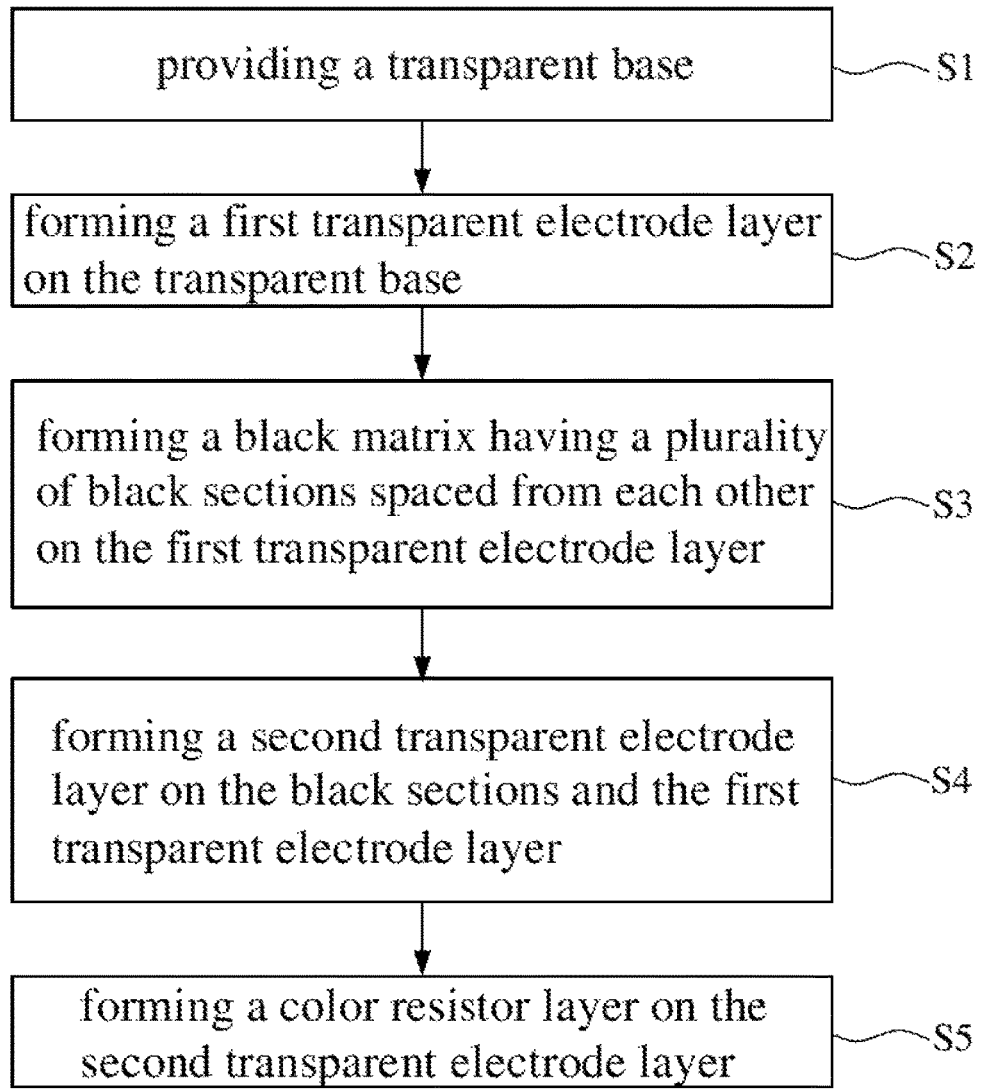
FIG. 2 is a flowchart of a method for manufacturing a color filter substrate according to one embodiment of the present invention.

Referring to FIG. 2, another embodiment of the present invention provides a method for manufacturing a color filter substrate, which mainly comprises steps of (S1) providing a transparent base 11; (S2) forming a first transparent electrode layer 12 on the transparent base 11; (S3) forming a black matrix 13 having a plurality of black sections 131 spaced from each other on the first transparent electrode layer 12; (S4) forming a second transparent electrode layer 14 on the black sections 131 and the first transparent electrode layer 12; and (S5) forming a color resistor layer 15 on the second transparent electrode layer 14. Preferably, the black sections 131 are disposed between the first transparent electrode layer 12 and the second transparent electrode layer 14. In the step (S1), the transparent base 11 can be a glass substrate having a thickness ranged from about 0.4 to 1 mm. in the steps (S2) and (S4), the first transparent electrode layer 12 and the second transparent electrode layer 14 can be metal oxides (ex. ITO), graphene-based materials, polyaniline-based materials, or polypyrrole-based materials, which can be formed by, for example, magnetron sputtering, electrochemical atomic layer epitaxy, chemical vapor deposition, or physical vapor deposition. The first transparent electrode layer 12 and the second transparent electrode layer 14 respectively have a thickness of 20 to 300 nm. In the step (S3), the material of the black matrix 13 can be a composition of acrylic and black carbon materials, which is formed by imprinting, ink-jetting, or exposure after slit coating, but it is not limited thereto. In the step (S5), the color resistor layer 15 is for example formed by RGB color resistor materials and has a thickness ranged from 1.5 to 3 microns. The color resistor layer 15 can be formed by the lithography technology.

Preferably, according to the present invention, a portion of the first transparent electrode layer 12 of the color filter substrate 10 is aligned to the color resistor units 151 and disposed between the second transparent electrode layer 14 and the transparent base 11. In addition, a portion 14a of the second transparent electrode layer 14 is disposed between the first transparent electrode layer 12 and the color resistor layer 15. The portion 14a of the second transparent electrode layer 14 directly contacts with the first transparent electrode layer 12. The first transparent electrode layer 12 and the second transparent electrode layer 14 construct a sealed space for containing at least one of the black sections 131.

In addition to the above steps (S1) to (S5), the present invention comprises the steps: (S6) forming a protective plane 16; and (S7) forming a plurality of space units 17 on the protective plane 16. The protective plane 16 can be formed by thermosetting overcoat materials or UV curing overcoat materials, such as a mixture having a main component of acrylic resins, with a thickness ranged from 1 to 3 microns. The intervals between the color resistor units 151 can be filled with the protective plane 16 to form a flat surface. A portion 14b of the second transparent electrode layer 14 is aligned to the black sections 131 and directly contacts with the protective plane 16. The space units 17 can be formed by using the lithography technology, and has a height ranged from 2.5 to 4 microns. The space units 17 are spaced from each other and arranged on the protective plane 16 as well as aligned to the positions corresponding with a portion of the black sections 131.

As mentioned above, the black matrix is covered and sandwiched by two layers of the transparent conductive layers, thereby effectively shielding the internal electric field generated from the black matrix, and further solving the problem of orientation behavior of the liquid crystal molecules disturbed by the internal electric field. Moreover, the defects such as green mura and light leakage caused by the black matrix using high carbon number materials can also be reduced.

The present invention has been described with preferred embodiments thereof and it is understood that many changes and modifications to the described embodiments can be carried out without departing from the scope and the spirit of the invention that is intended to be limited only by the appended claims.

What is claimed is:

1. A color filter substrate, comprising in sequence:
    a transparent base;
    a first transparent electrode layer formed on the transparent base;
    a black matrix comprising a plurality of black sections spaced from each other on the first transparent electrode layer;
    a second transparent electrode layer formed on the black sections and the first transparent electrode layer; and
    a color resistor layer formed on the second transparent electrode layer, wherein a portion of the second transparent electrode layer is longitudinally disposed between the first transparent electrode layer and the color resistor layer;
    wherein the black sections are disposed between the first transparent electrode layer and the second transparent electrode layer, and the black sections are sealed only by the first transparent electrode layer and the second transparent electrode layer in a sealed space that is commonly defined by the first transparent electrode layer and the second transparent electrode layer.

2. The color filter substrate according to claim 1, wherein the color filter substrate further comprises a protective plane formed on the color resistor layer.

3. The color filter substrate according to claim 2, wherein the color filter substrate further comprises a plurality of space units spaced from each other on the protective plane and aligned to a portion of the black sections.

4. The color filter substrate according to claim 2, wherein a portion of the second transparent electrode layer is aligned to the black sections and directly contacts with the protective plane.

5. The color filter substrate according to claim 1, wherein the color resistor layer comprises a plurality of color resistor units and each of the color resistor units is disposed between two of the black sections adjacent to each other.

6. The color filter substrate according to claim 5, wherein a portion of the first transparent electrode layer is aligned to the color resistor units and is disposed between the second transparent electrode layer and the transparent base.

7. The color filter substrate according to claim 1, wherein the portion of the second transparent electrode layer directly contacts with the first transparent electrode layer.

8. A method for manufacturing a color filter substrate, comprising steps of:
    providing a transparent base;
    forming a first transparent electrode layer on the transparent base;
    forming a black matrix having a plurality of black sections spaced from each other on the first transparent electrode layer;
    forming a second transparent electrode layer on the black sections and the first transparent electrode layer; and
    forming a color resistor layer on the second transparent electrode layer;
    wherein the black sections are disposed between the first transparent electrode layer and the second transparent electrode layer, and the black sections are sealed only by the first transparent electrode layer and the second transparent electrode layer in a sealed space that is commonly defined by the first transparent electrode layer and the second transparent electrode layer, wherein a portion of the second transparent electrode layer is longitudinally disposed between the first transparent electrode layer and the color resistor layer.

9. The method according to claim 8, wherein after forming the color resistor layer, the method further comprises a step of:
    forming a protective plane on the color resistor layer.

10. The method according to claim 9, wherein the method further comprises a step of:
    forming a plurality of space units aligned to a portion of the black sections on the protective plane.

11. The method according to claim 9, wherein a portion of the second transparent electrode layer is aligned to the black sections and directly contacts with the protective plane.

12. The method according to claim 8, wherein the color resistor layer comprises a plurality of color resistor units and each of the color resistor units is disposed between two of the black sections adjacent to each other.

13. The method according to claim 12, wherein a portion of the first transparent electrode layer is aligned to the color resistor units and is disposed between the second transparent electrode layer and the transparent base.

14. The method according to claim 8, wherein the portion of the second transparent electrode layer directly contacts with the first transparent electrode layer.

* * * * *